Figure 1:
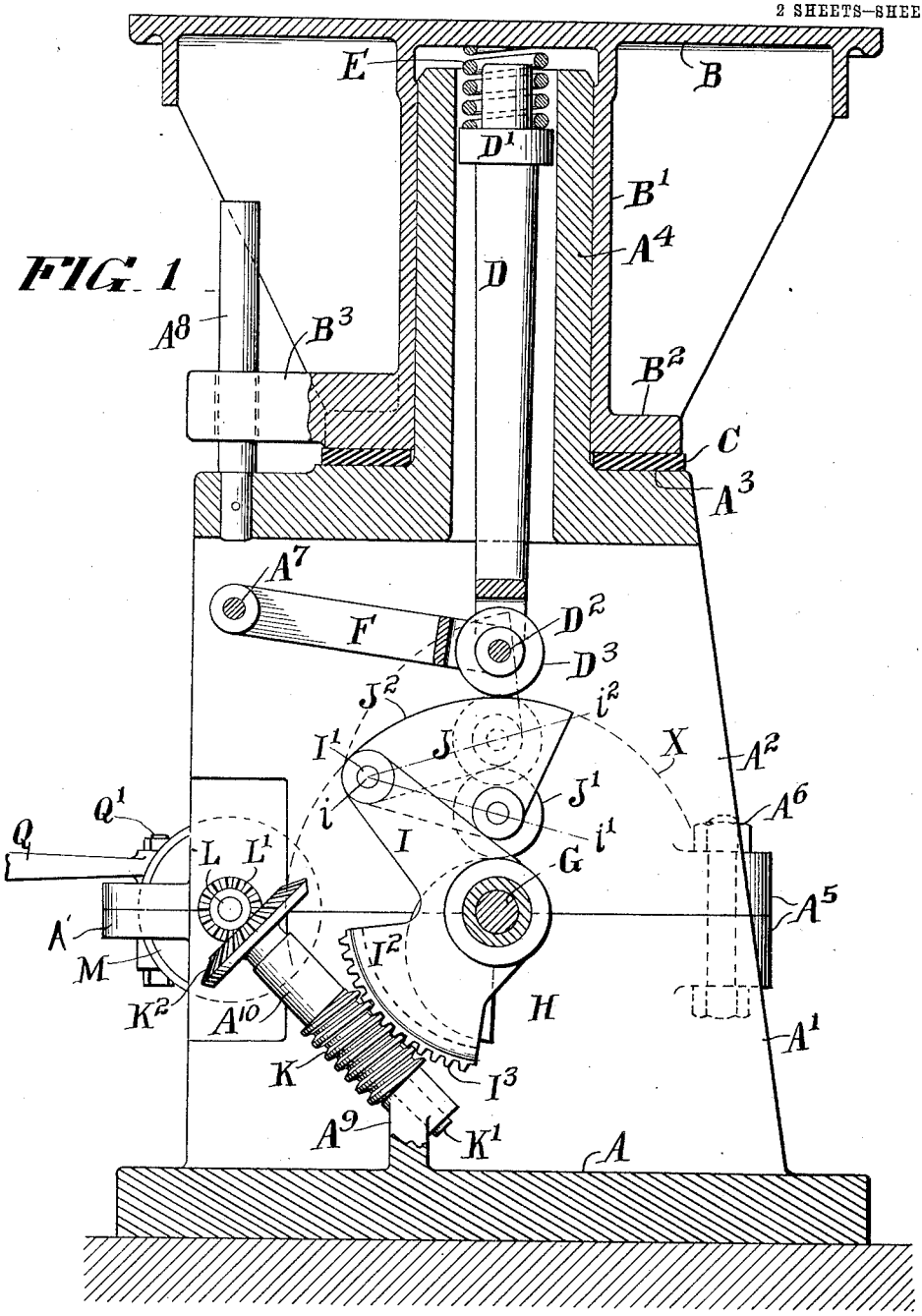

W. LEWIS & J. T. RAMSDEN.
MOLDING MACHINE.
APPLICATION FILED MAR. 15, 1912.

1,113,794.

Patented Oct. 13, 1914.
2 SHEETS—SHEET 1.

WITNESSES

INVENTORS

BY

ATTORNEY

W. LEWIS & J. T. RAMSDEN.
MOLDING MACHINE.
APPLICATION FILED MAR. 15, 1912.
1,113,794.
Patented Oct. 13, 1914.
2 SHEETS—SHEET 2.
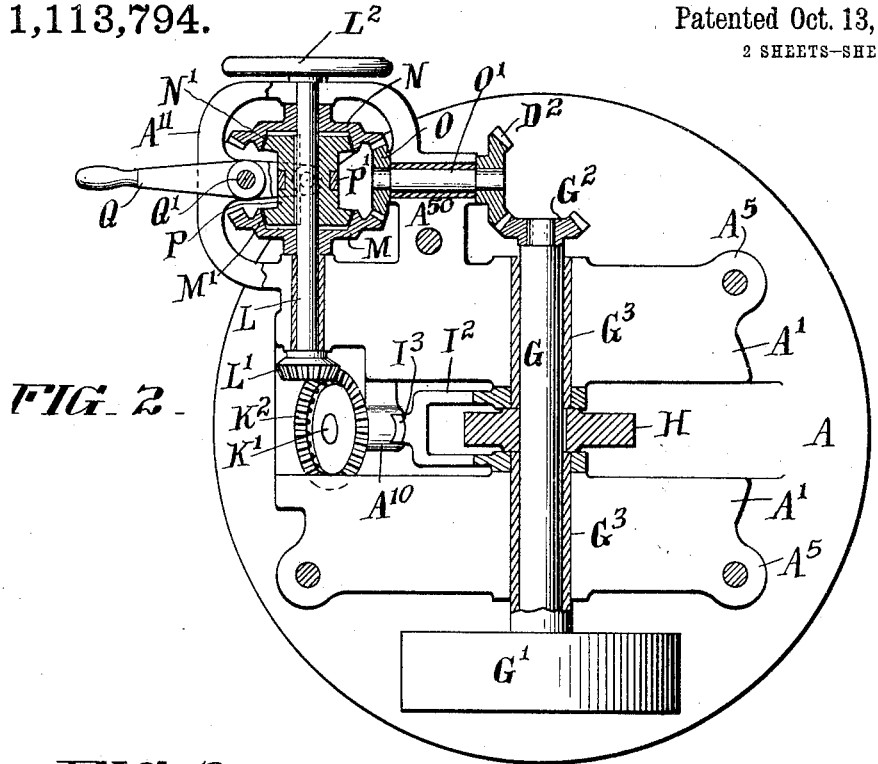
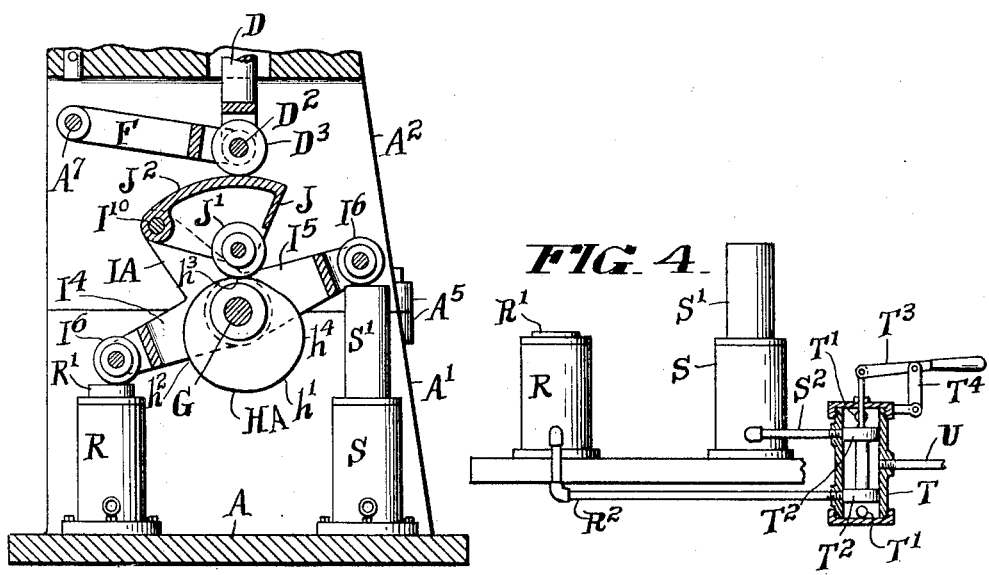
WITNESSES
INVENTORS
Wilfred Lewis
John T. Ramsden
BY
Francis I. Chambers
ATTORNEY

UNITED STATES PATENT OFFICE.

WILFRED LEWIS AND JOHN T. RAMSDEN, OF PHILADELPHIA, PENNSYLVANIA, ASSIGNORS TO THE TABOR MANUFACTURING COMPANY, OF PHILADELPHIA, PENNSYLVANIA, A CORPORATION OF PENNSYLVANIA.

MOLDING-MACHINE.

1,113,794.   Specification of Letters Patent.   Patented Oct. 13, 1914.

Application filed March 15, 1912. Serial No. 683,951.

*To all whom it may concern:*

Be it known that we, WILFRED LEWIS and JOHN T. RAMSDEN, both citizens of the United States of America, residing in the city and county of Philadelphia, in the State of Pennsylvania, have invented a certain new and useful Improvement in Molding-Machines, of which the following is a true and exact description, reference being had to the accompanying drawings, which form a part thereof.

Our present invention relates to jar molding machines of the kind in which the mold support is alternately lifted above and then allowed to fall back into collision with the anvil of the machine to thereby compact the sand or other mold forming material about the pattern or patterns mounted on the mold support.

The object of the invention is to provide simple and effective mechanical provisions for lifting the mold support above the anvil and for varying the distance through which the mold support is thus elevated to thereby vary the intensity of the blow struck on collision and also to facilitate starting the machine into operation. Variations in intensity of the blows struck are desirable in forming molds of different kinds, and in some cases, in different stages of a single mold forming operation.

In carrying out our invention we employ a cam for lifting the mold support above the anvil and interpose between the cam and the mold support a thrust transmitting element which is shiftable to vary the movement imparted by the cam to the mold support. In the preferred construction illustrated the cam employed is a rotary cam and the thrust transmitting element is a lever oscillated by the cam, and pivoted to a fulcrum support which is adjustable manually or by power about the axis of rotation of the cam shaft, to thereby vary the leverage with which the thrust imparted to the lever by the cam is transmitted to the mold support.

The various features of novelty which characterize our invention are pointed out with particularity in the claims annexed to and forming a part of this specification. For a better understanding of the invention however and the advantages possessed by it reference should be had to the accompanying drawings and descriptive matter in which we have illustrated and described several forms in which our invention may be embodied.

Of the drawings, Figure 1 is a sectional elevation of one form of molding machine constructed in accordance with our present invention. Fig. 2 is a plan view of a portion of the machine shown in Fig. 1. Fig. 3 is a partial sectional elevation of a modified form of molding machine embodying our present invention. Fig. 4 is a diagrammatic view of a portion of the apparatus shown in Fig. 3 and the fluid pressure piping and controlling valve therefor.

In the drawings, and referring first to the construction shown in Figs. 1 and 2, A represents the anvil member of the machine which may be either of the stationary type or of the floating type employed in the so called "shockless" jarring machine covered by Patent No. 941,999 granted November 30, 1909 to Wilfred Lewis, one of the applicants herein. As shown the anvil member A is divided into two parts. The lower portion of the anvil member terminates at its upper end in two spaced apart portions $A'$ and the lower portion of the upper part of the anvil member is similarly divided into two corresponding parts $A^2$. The parts $A'$ and $A^2$ are formed with ears $A^5$ and $A^{50}$ receiving the bolts $A^6$ by which the upper and lower parts of the anvil member are secured together. The upper portion of the anvil member is provided with an annular impact surface $A^3$ which surrounds the tubular upper extension $A^4$ of the anvil member. The mold support B of the machine which may be of the usual form comprises a table or mold supporting portion proper and a depending cylindrical portion $B'$ which slides on the tubular extension $A^4$ of the anvil. At its lower end the cylindrical portion $B'$ is enlarged to provide a striking shoulder $B^2$. A guide pin $A^8$ secured to the anvil member A is slidingly received in an ear $B^3$ formed on the mold supporting member and prevents rotation of the mold support on the tubular extension $A^4$ of the anvil member. Working in the axial passage in the tubular anvil portion $A^4$ is a member D provided at its upper end with an enlargement $D'$ forming a piston like guide engaging the inner wall of the portion $A^4$ when the member D is raised and lowered as hereinafter described. The enlargement D' also forms a seat for a cushioning spring E interposed between the member D and the mold support.

Advantageously the member D is pivotally connected at its lower end to one end of a lever F as by the pin $D^2$ which serves also as the shaft for an anti-friction roll $D^3$. At its end remote from the lever D, the lever F is pivotally connected to the anvil as by the pin $A^7$. Journaled in suitable bearing sleeves $G^3$ received in matching channels formed in the adjacent ends of the anvil portions A' and $A^2$ is the main cam shaft G, of the machine. It may be explained at this point that the purpose of dividing the anvil into upper and lower portions as described, is to facilitate the mounting of the cam shaft G and the shaft L hereinafter referred to. At one end the shaft G has secured to it a driving pulley G' which in lieu of any other fly-wheel may advantageously be made heavy to equalize the load on the power device through which the shaft G is rotated. A cam H is secured to the cam shaft G in the slot or opening formed between the anvil portions $A'$, $A'$ and $A^2$, $A^2$. There is also journaled on the shaft G, or preferably as shown, on the bearing sleeves $G^3$, a lever member I. Pivotally connected to the lever member I as by the pin I' is a member J having journaled in it an anti-friction roll J' which rides on the periphery of the cam H. The member J is formed with a curved surface $J^2$ engaged by the anti-friction roll $D^3$ and substantially concentric about the axis of the shaft G when the position of the cam H permits the anti-friction roll J' to come closest to the shaft G. The member I is adapted to be adjusted angularly about the shaft G in order to vary the extent of the rising and falling movement of the mold support as hereinafter explained. Preferably the surface $J^2$ of the member J engaged by the anti-friction roll $D^3$ is so curved that when the position of the cam H permits the anti-friction roll J' to come closest to the axis of the shaft G, the surface $J^2$ will contact a circle, as the circle X, drawn about the axis of the shaft G as a center, regardless of the position into which the pivot pin I' may be angularly adjusted.

In the arrangement shown in Figs. 1 and 2 the lever I is formed with a gear segment portion $I^2$ having spiral gear teeth $I^3$ which mesh with the thread or threads on a worm K secured to a shaft K'. The latter is mounted in suitable brackets $A^9$ and $A^{10}$ carried by the anvil and has secured to it at one end a bevel gear $K^2$ which meshes with the bevel gear L' carried by the shaft L. The shaft L has loosely mounted on it an opposing pair of bevel gears M and N in mesh with a gear wheel O carried by the shaft O'. The shaft O' has secured to its opposite end a bevel gear $D^2$ which meshes with the bevel gear $G^2$, secured to the corresponding end of the cam shaft G. The gear wheels M and N are formed with conical cavities M' and N' and a sleeve P splined on the shaft L is adapted to be moved axially on the shaft L to bring either end as desired into frictional driving engagement with the conical wall of the cavity formed in the corresponding wheel N or M, accordingly as it is desired to shift the lever I angularly in one direction or the other about the axis of the shaft H. The axial adjustment of the member P is brought about in the mechanism shown by the lever Q engaging trunnions carried by a collar P' working in a groove formed in the member P. The lever Q is fulcrumed at Q' to the bracket extension $A^{11}$ of the anvil in which the shaft O' and the outer end of the shaft L are journaled. Those skilled in the art will understand that the well known type of reversing clutch mechanism described is only one of many which might be employed to couple the shafts L and G for rotation of the former in either direction as desired. The shaft L may also be provided with a handwheel $L^2$ for manual rotation of the shaft. With the mechanism described it will be apparent that on each rotation of the cam shaft G the lever element J will be oscillated about the axis of the pin I' through the angle $i''\ i\ i^2$ regardless of the position into which the pin I' may be adjusted. It will be apparent, however, that the extent of movement imparted to the plunger element D and thereby to the mold support B by each oscillation of the member J will depend upon the position of the pivot pin I' and will increase or decrease accordingly as the pivot pin is shifted in the clockwise or reverse direction. It will be apparent moreover, that with the surface $J^2$ curved as described above, the mold support may always impinge freely against the anvil when allowed to drop regardless of the position into which the fulcrum pin I' may be adjusted. This is independent moreover of whether or not the axis of shaft G is in the position shown in Figs. 1 and 2 or is laterally displaced to the left slightly as may be desirable in order to decrease the maximum obliquity to the vertical of the forces imposed upon and exerted by the lever J as the latter is oscillated.

The modified molding machine shown in Fig. 3 differs from that first described only in the shape of the lever IA of Fig. 3 which corresponds to the lever I of the mechanism first described, and in the provisions for adjusting the lever IA angularly about the shaft G and in the shape of the cam HA which replaces the cam H of Figs. 1 and 2. The lever IA to which the thrust transmitting lever element J is pivoted at $I^{10}$ is, as shown in Fig. 3, formed with two opposing arms I⁴ and I⁵ each carrying at its outer end anti-friction rolls I⁶. These anti-friction rolls are arranged in line with pistons R′ and S′ working in cylinders R and S secured to the anvil member. As shown pipes R² and S² connect ports formed in the lower ends of the cylinders R and S respectively to a valve casing T. Pressure fluid as compressed air is supplied to the valve casing T by a supply pipe U. The valve casing T is provided at its ends with outlet ports T′. A piston valve member T² working in the valve casing T has its stem connected to an operating handle T³ which is pivotally connected by the link T⁴ to one of the end heads of the valve casing. By shifting the position of the valve member T² in either direction from the position shown in Fig. 4 one of the pipes R² and S² is connected to the atmosphere through the corresponding port T′ and the other of the two pipes R² and S² is placed in communication with the supply pipe U. Those skilled in the art will understand that by thus supplying pressure fluid to one of the cylinders R and S and at the same time connecting the other of these cylinders to exhaust, the lever IA may be shifted in one direction or the other as desired. When the valve member T² is in the position shown in Fig. 4 both cylinders R and S are cut off both from the pipe U and from exhaust and the pistons R′ and S′ are thereby maintained in the position into which they have been moved.

The cam HA employed in the machine shown in Fig. 3 is formed with a rising portion $h'—h^2—h^3$ which may be like the rising portion of the cam shown in Figs. 1 and 2, but unlike the latter cam, the cam HA is provided with a descending portion $h^3—h^4—h'$ so shaped that the roller J′ will bear against the cam in all stages of the operation. By employing a cam of this kind we avoid the hammer blow experienced with the cam shown in Fig. 1 when the downward movement of the plunger D, lever F, and lever member J is suddenly arrested by the engagement of the roll J′ with the low portion of the cam. By preference we shape the cam portion $h^3—h^4—h'$ so that, with a constant speed of rotation of the cam shaft G, the plunger D will descend with a substantially constant acceleration. In such case the force of the blow struck may be varied both by varying the height to which the mold support is lifted preparatory to collision, and also, within limits, by varying the speed of rotation of the cam shaft and thereby varying the retarding effect on the mold support exerted by the cam.

We make no claim herein however to means for retarding the falling movement of the mold support by varying the speed of rotation of such a cam as that shown in Fig. 3, as this is not our joint invention, but is the sole invention of one of us: to wit, Wilfred Lewis, and is claimed by him in his application Serial No. 683,978 filed of even date herewith.

It will be apparent that with either form of apparatus disclosed the intensity of the blows struck may be very easily adjusted as conditions make desirable. Moreover, in starting the machine it is possible with either form to bring the cam shaft up to speed before putting any load on the cam, and then by adjusting the thrust transmitting lever to obtain blows of the desired intensity. This makes the machine easy to operate and permits it to be operated by a driving motor of smaller power than would otherwise be required.

While in accordance with the provisions of the statutes we have illustrated and described the best form of our invention now known to us, it will be apparent to those skilled in the art that changes may be made in the form of the apparatus disclosed and may be used without departing from the spirit of our invention. It will also be understood by those skilled in the art that under some conditions it may be of advantage to use certain features of the invention without a corresponding use of the others.

Having now described our invention, what we claim is new and desire to secure by Letters Patent is:

1. In a jar molding machine, the combination with the mold support and anvil, of means for lifting the mold support above the anvil preparatory to collision comprising a cam and a thrust transmitting lever element interposed between the cam and the mold support and adjustable to vary the leverage with which the cam acts on the mold support in lifting the latter.

2. In a jar molding machine, the combination with the mold support and anvil, of means for lifting the mold support above the anvil preparatory to collision comprising a rotating cam and a thrust transmitting element angularly adjustable about the axis of rotation of the cam to thereby vary the extent of movement imparted to the mold support on each rotation of the cam.

3. In a jar molding machine, the combination with the mold support and anvil, of means for lifting the mold support above the anvil preparatory to collision comprising a cam shaft journaled in the anvil, a cam carried by said shaft, a thrust transmitting element interposed between the cam and the mold support, and a fulcrum member angularly adjustable about the axis of said cam shaft and to which said element is pivoted.

4. In a jar molding machine, the combination with the mold support and anvil, of a rotating cam, a fulcrum member angularly adjustable about the axis of rotation of the cam, and a thrust transmitting element pivotally connected to said fulcrum element and interposed between said mold support and cam and oscillated by the latter to thereby alternately lift the mold support above the anvil and thereafter permit it to fall back into collision therewith.

5. In a jar molding machine, the combination with the mold support and anvil, of a rotating cam, a fulcrum member angularly adjustable about the axis of rotation of the cam, and a thrust transmitting element pivotally connected to said fulcrum element and interposed between said mold support and cam and oscillated by the latter to thereby alternately lift the mold support above the anvil and thereafter permit it to fall back into collision therewith, said thrust transmitting element having a convex thrust transmitting surface substantially concentric with the axis of rotation of the cam when in the position in which the mold support and anvil are free to collide.

6. In a jar molding machine, the combination with the mold support and the anvil, of means for lifting the mold support above the anvil preparatory to collision comprising a rotatable cam shaft, a cam carried thereby, a thrust transmitting element interposed between the cam and the mold support means for adjusting said element to thereby vary the extent of movement imparted to the mold support on each rotation of the cam shaft and a clutch mechanism for coupling said shaft and adjusting means for operation of the latter.

7. In a jar molding machine, the combination with the mold support and anvil, of means for lifting the mold support above the anvil preparatory to collision comprising a cam and a thrust transmitting element interposed between the cam and mold support and means for adjusting the relative arrangement of said mold support, thrust transmitting element, and cam to vary the extent of movement imparted to the mold support by said element relative to the extent of movement simultaneously imparted to the latter by said cam.

WILFRED LEWIS,
JOHN T. RAMSDEN.

Witnesses:
H. W. BROWN,
R. RAYMOND PORTER.

---

Copies of this patent may be obtained for five cents each, by addressing the "Commissioner of Patents, Washington, D. C."